(12) United States Patent
Arbuckle

(10) Patent No.: US 10,837,577 B2
(45) Date of Patent: Nov. 17, 2020

(54) FIXING APPARATUS AND METHOD

(71) Applicant: Linian Supply Co. Limited, Glasgow (GB)

(72) Inventor: Wesley Arbuckle, Glasgow (GB)

(73) Assignee: Linian Supply Co. Limited, Glasgow (GB)

( * ) Notice: Subject to any disclaimer, the term of this patent is extended or adjusted under 35 U.S.C. 154(b) by 0 days.

(21) Appl. No.: 16/081,025

(22) PCT Filed: Feb. 16, 2017

(86) PCT No.: PCT/GB2017/050407
§ 371 (c)(1),
(2) Date: Aug. 29, 2018

(87) PCT Pub. No.: WO2017/149271
PCT Pub. Date: Sep. 8, 2017

(65) Prior Publication Data
US 2019/0072212 A1   Mar. 7, 2019

(30) Foreign Application Priority Data

Mar. 3, 2016   (GB) .................................. 1603692.3

(51) Int. Cl.
*F16L 3/04* (2006.01)
*F16B 5/06* (2006.01)
(Continued)

(52) U.S. Cl.
CPC .............. *F16L 3/04* (2013.01); *F16B 5/0685* (2013.01); *F16L 3/127* (2013.01); *H02G 3/32* (2013.01); *F16L 3/237* (2013.01)

(58) Field of Classification Search
CPC ... F16L 3/04; F16L 3/127; F16L 3/237; F16L 3/00; F16B 5/0685; H02G 3/32
(Continued)

(56) References Cited

U.S. PATENT DOCUMENTS 3,633,250 A * 1/1972 Romney ................. A47F 7/163
16/387
3,737,128 A * 6/1973 Schuplin ............... F16B 19/004
248/71
(Continued)

FOREIGN PATENT DOCUMENTS

EP    0105865 A2    4/1984
EP    0433621 A2    6/1991

OTHER PUBLICATIONS

International Search Report, PCT/GB2018/052422, EPO (dated Dec. 6, 2018).
(Continued)

*Primary Examiner* — Nkeisha Smith
(74) *Attorney, Agent, or Firm* — Wright IP & International Law; Eric G. Wright

(57) ABSTRACT

Disclosed is a fixing for securing an article to a surface. The fixing comprising a coupling arrangement for coupling the fixing to an article such as cabling. Elongate members extend from the coupling arrangement and are moved together to insert the fixing into a cavity, and spring apart to retain the fixing in the cavity. The elongate members have resiliently deformable inner formations positioned which are spaced apart from the ends of the elongate members. The inner formations engage with one another and resiliently deform when the elongate members are brought together. The inner formations apply additional forces urging the elongate members apart, thereby increasing the pull resistance of the fixing. Also disclosed is a fixing in which the elongate members have conformable outer portions, to conform to the inner surface of a cavity and increase pull resistance; and a method of securing an article to a surface.

15 Claims, 5 Drawing Sheets

(51) Int. Cl.
*F16L 3/127* (2006.01)
*H02G 3/32* (2006.01)
*F16L 3/237* (2006.01)

(58) Field of Classification Search
USPC .......... 248/65, 73, 71, 74.1, 74.2, 74.3, 74.4
See application file for complete search history.

(56) References Cited

U.S. PATENT DOCUMENTS

| | | | | |
|---|---|---|---|---|
| 4,260,122 A * | 4/1981 | Fiala | .................... | F16L 3/127 248/71 |
| 5,845,883 A * | 12/1998 | Meyer | .................. | F16B 19/004 248/73 |
| 6,161,804 A * | 12/2000 | Paske | ....................... | F16L 3/12 248/71 |
| 6,276,644 B1 * | 8/2001 | Jennings | .................. | F16L 3/04 248/49 |
| 6,296,430 B1 * | 10/2001 | Fischer | ................ | F16B 19/002 411/33 |
| 6,742,760 B2 * | 6/2004 | Blickhan | ............. | A61M 39/284 251/11 |
| 6,896,461 B2 * | 5/2005 | Fleydervish | ............ | F16B 37/02 411/55 |
| 9,488,208 B2 * | 11/2016 | Hemingway | ......... | F16B 1/0014 |
| 10,047,775 B2 * | 8/2018 | Bruckbauer | ............. | H02G 3/32 |
| 2002/0066833 A1 * | 6/2002 | Ferrill | ....................... | F16L 3/04 248/62 |
| 2003/0021655 A1 * | 1/2003 | Correll | ............... | F16I 315/0015 411/473 |
| 2005/0069398 A1 * | 3/2005 | Arbuckle | ................ | F16B 2/248 411/477 |
| 2014/0017025 A1 | 1/2014 | Hemingway et al. | | |
| 2015/0330560 A1 * | 11/2015 | Zhang | ..................... | B25H 3/00 248/220.22 |

OTHER PUBLICATIONS

International Search Report, PCT/GB2017/050407, EPO (dated Apr. 28, 2017).

* cited by examiner

FIXING APPARATUS AND METHOD

CROSS-REFERENCE TO RELATED APPLICATIONS

This application is a US National Stage Entry of PCT/GB2017/050407 titled "Fixing Apparatus And Method" filed Feb. 16, 2017, which claims benefit of foreign priority to GB 1603692.3 filed Mar. 3, 2016, and titled "Fixing Apparatus And Method". This application claims the benefit of foreign priority to GB 1603692.3 filed Mar. 3, 2016, through PCT/GB2017/050407 filed Feb. 16, 2017.

CROSS-REFERENCE TO RELATED APPLICATIONS

This US National Stage Entry incorporates by reference in its entirety copending PCT Application No. PCT/GB2017/050407 titled "Fixing Apparatus And Method" filed Feb. 16, 2017, which incorporates by reference in its entirety GB 1603692.3 filed Mar. 3, 2016, and which is titled "Fixing Apparatus And Method". GB 1603692.3 filed Mar. 3, 2016, is incorporated by reference herein in its entirety.

FIELD OF THE INVENTION

The present invention relates to apparatus and methods for securing articles to a surface, such as a wall of a building, and in particular the invention relates to securing cabling, pipework and the like.

BACKGROUND TO THE INVENTION

In order to attach articles to a wall or other surface, for example of a building, it is known to use a fixing such as a bracket or saddle clip. Conventionally, such fixings are installed by drilling a suitably sized hole, inserting a deformable plug (such as a rawl plug or butterfly plug) and passing a screw though an aperture in the fixing and into the deformable plug. The screw causes the plug to deform or expand, applying pressure against the walls of the hole, thereby retaining the fixing in place.

Use of fixings of this general type can however be time consuming. Each fixing can take at least around 30-60 seconds to install and this can be problematic when a large number of fixings are required. For example, when a long run of cabling or pipework or the like is to be secured to a wall, hundreds or in some cases thousands of fixings are required and the cumulative time to install them can significantly contribute to the overall time for an installation.

One approach to address this issue has been the use of fixings or clips which require neither a screw nor a plug to install. A clip can be used having opposed resiliently biased legs. The legs can be squeezed together to introduce the clip into a hole, and when released spring outwardly and into engagement with the walls of the hole. Barbs on the outside of the legs may provide additional engagement with the wall and increase the force required to remove the clip from the hole. One such device, for fixing cables, is the Linian Fire Clip™ of Linian Supply Co. Limited, Glasgow, United Kingdom.

Whilst devices such as the Linian Fire Clip provide a substantial time saving for fixing long runs of cabling, their utility is limited by the forces required to remove them (typically around 100-110 N). There remains a need for fixings which may be installed with similar efficiency, and which are capable of securing still greater loads.

SUMMARY OF THE INVENTION

According to a first aspect of the invention there is provided a fixing for securing an article to a surface;
the fixing comprising a coupling arrangement, for coupling the fixing to a said article; and
two elongate members extending from the coupling arrangement;
    the elongate members being resiliently biased towards a position in which they are spaced apart from one another along at least a part of their length;
    each elongate member comprising a resiliently deformable inner formation spaced apart from a proximal end and a distal end of the elongate member, the inner formations extending toward an adjacent elongate member and positioned to engage therewith and resiliently deform, when the elongate members are brought together in use.

The elongate members may be brought together (typically manually squeezed together) and inserted into a cavity, such as a cylindrical hole as formed by a drill or the like. The elongate members are resiliently biased apart so as to into engage with the cavity walls and retain the fixing in position. The relative size of the cavity to the elongate members may be selected so that the inner formations are also resiliently deformed on insertion of the elongate members, and thereby supplement the outward forces applied to the cavity walls. Moreover, the inner formations are positioned so that the outward forces they apply are distributed along the elongate members both proximally and distally of the inner formations. Accordingly, the provision of inner formations on the elongate members increases the "pull out resistance" of the fixing (i.e. the force required to remove it from the cavity).

The elongate members may be biased towards a position in which they diverge from one another away from their proximal ends. The elongate members may be biased towards a position in which they diverge from one another away from their distal ends.

The elongate members may be generally bowed, and biased towards a position in which their proximal and distal ends converge.

The elongate members may be joined at their proximal and/or distal ends.

The elongate members may be biased towards a position in which they are spaced apart along all, or the majority of their length.

When we refer to any part of the fixing, such as the elongate members, being biased towards a positon, we refer to the position adopted in the absence of any forces or physical constraints applied to relevant part of the fixing.

The inner formation of a first elongate member may be positioned to engage with the inner formation of a second elongate member, when the elongate members are brought together.

An inner formation may extend from an inside of an elongate member.

An inner formation may comprise a resilient member extending from an inside of an elongate member. For example, an inner formation may comprise an arm extending from an inside of an elongate member. An inner formation may be a branch from an inside of an elongate member.

An elongate member may be branched; one or more branches thereof functioning as an inner formation.

An inner formation may be formed as a kink, bend or corrugation along an elongate member.

An elongate member may be resilient. Thus, a kink, bend or corrugation in a resilient elongate member may function as a resiliently deformable inner formation.

An inner formation may comprise a deformable region, comprising for example an elastomeric or resilient plastics material. The elongate members may comprise a sleeve comprising one or more resiliently deformable materials, such as elastomers and the like. An elastomeric material may be glued or mechanically fixed to an inside of an elongate member.

An elongate member may comprise two, or more than two, inner formations (which may be the same or of more than one type). Two or more inner formations may be spaced apart along a length of an elongate member.

Terms such as inside, inner, or inward refer to a surface(s), formation or region of an elongate member having an orientation or extending in a direction generally towards another elongate member. Conversely, terms such as outside or outer, refer to a direction or orientation of an elongate member generally away from other elongate member(s).

The elongate members may comprise distal portions free of inner formations. In use, once the inner formations have engaged with adjacent elongate members, the distal portions may be brought closer together without significant deformation of the inner formations.

This arrangement facilitates insertion of the distal portions into a cavity. Moreover, the application of a force generally along the elongate members (i.e. the insertion direction) may be translated into resilient deformation of the inner formations.

A distal portion of an elongate member may be inwardly curved or kinked. The distal portion may transition smoothly to the portion of the elongate member proximal thereto.

When brought together, the distal portions may form a wedge, so assist in guiding the elongate members into a cavity. For example, outer surface of at least the distal portions may be smooth.

An elongate member may comprise one or more barbs or projections extending outwardly. Such barbs or projects may assist in engaging with a cavity wall, in use.

The one or more barbs/projections are preferably oriented away from the distal end of the elongate member so as to engage most strongly with a cavity wall when a force is applied to pull the fixing from the cavity. For example, the one or more barbs/projections may be ramped away from the distal end of the elongate member. The one or more barbs/projections may be resilient.

The relative position of inner formations and barbs along an elongate member may be selected so that the outward forces applied by the inner formations in use are effectively transferred to the barbs.

An inner formation may be positioned adjacent to a barb, along an elongate member. An inner formation may be positioned between barbs, along an elongate member. An elongate member may comprise barbs proximal and distal to an inner formation.

At least a portion of an outer surface of an elongate member may be conformable, for example to an inner surface of a cavity. For example, an elongate member may comprise an outer conformable region along all or a part of its length. A conformable region may be plastically deformable or flowable, or elastically deformable. In use, the outer conformable region may conform to an inside of a cavity, and convey additional pull resistance.

The invention extends in a second aspect to a fixing for securing an article to a surface;
the fixing comprising a coupling arrangement, for coupling the fixing to a said article; and
two elongate members extending from the coupling arrangement;
the elongate members being resiliently biased towards a position in which they are spaced apart from one another along at least a part of their length;
each elongate member comprising an outer conformable region along all or a part of its length.

Each elongate member may have a proximal end adjacent to the coupling arrangement and a distal end, and comprise a resiliently deformable inner formation spaced apart from the proximal and distal ends, the inner formations extending toward an adjacent elongate member and positioned to engage therewith and resiliently deform, when the elongate members are brought together in use.

An outer conformable region may be formed from a plastics material. An outer conformable region may be formed from an elastomeric material.

An outer conformable region may be affixed to an elongate member by any suitable method. For example, an elongate member may comprise a sleeve (such as a plastics or elastomeric sleeve). A conformable region, such as a block of a deformable material, may be adhesively or mechanically attached to an outer surface of an elongate member.

An elongate member may comprise a keying formation, such as a ridged or corrugated surface, to improve bonding to an outer conformable region. A keying formation, for example comprising ridges across (rather than along a length of) an outside of an elongate member may also resist slippage between a conformable region and the elongate member when a fixing is urged into or out of a cavity, in use.

The fixing may comprise more than two elongate members. The fixing may comprise one or more pairs of opposed elongate members. The fixing may comprise three or more elongate members diverging from the coupling arrangement, operable to be brought together in use.

Typically, each elongate member is the same however the invention is not limited to a fixing having two or more identical elongate members.

The coupling arrangement may comprise a loop or hook or T-Bar or screw-type head (for back box fixing). The coupling arrangement, in particular a loop, may extend from a proximal end of a first elongate member to a proximal end of a second elongate member. The elongate members and the coupling arrangement may be formed from a single strip of material.

At least a part of the coupling arrangement may be resilient, and so contribute to the biasing of the elongate members. For example, the fixing may comprise a resilient hook or loop or T-Bar head or screw-type head.

The invention is not limited to any particular type of coupling. For example, the fixing may be adapted to secure cables, piping or the like (e.g. the hook or loop described above) of may be a releasable coupling such as a bracket. The coupling may comprise a male and female cooperating formations, removably securable to one another, the removable portion of which is securable to an article; so as to facilitate temporary removal of the article from the fixing.

The fixing may be a clip, such as a cable clip. The clip, and the coupling arrangement in particular, may be sized to clip a cable, conduit, duct, pipe or the like to a surface (e.g.

a wall). The clip or its coupling arrangement may be sized or configured to clip a more than one such article together and to a surface.

The elongate members may be sized to be inserted into a hole, typically a round hole, as made for example by a drill bit.

The fixing may be of unitary construction (i.e. formed from a single piece of material). The fixing may be provided with an external coating, such as a plastics coating, paint, lacquer, an anodized coating, or any other suitable protective coating. The coating may be of a particular colour (for example for consistency with cables which are colour coded for safety reasons).

The fixing may comprise or be substantially formed from a resilient material, such as steel.

In a third aspect of the invention there is provided a method of fixing an article to a surface, comprising;
- providing a cavity in a surface (for example by drilling a hole);
- providing a fixing having (at least) two elongate members extending from a coupling arrangement; the elongate members being resiliently biased towards a position in which they are spaced apart from one another along at least a part of their length;
- bringing the elongate members closer together and inserting the elongate members into the cavity;
- resiliently deforming an inner formation which is spaced apart from a proximal end and a distal end of the elongate member, and thereby applying an outward force to the elongate members; and/or causing an outer conformable region to conform to inner surfaces of the cavity under the action of outward forces applied to or by the elongate members; and
- coupling the article to the coupling arrangement.

The article may be coupled to the coupling arrangement before or after insertion of the elongate members into the cavity.

The method may comprise plastically or elastically deforming the or each outer conformable region.

The method may comprise bending branches or arms extending inwardly from one or both elongate members.

The method may comprise providing a fixing in accordance with other aspects of the invention.

The surface may be a wall, such as the wall of a building. The wall may be an external wall. The wall may be a concrete or stone wall. It will be understood that the invention is not limited to such applications, and the fixing may be configured for use with any type of wall material such as plasterboard, wood, brick, breeze block or the like.

It is also to be understood that preferred or optional features described in relation to any aspect of the invention may be present in combination with preferred or optional features described in relation to any other aspect of the invention.

DESCRIPTION OF THE DRAWINGS

Non-limiting example embodiments will now be described with reference to the following drawings in which.

DETAILED DESCRIPTION OF EXAMPLE EMBODIMENTS

Figure 1:
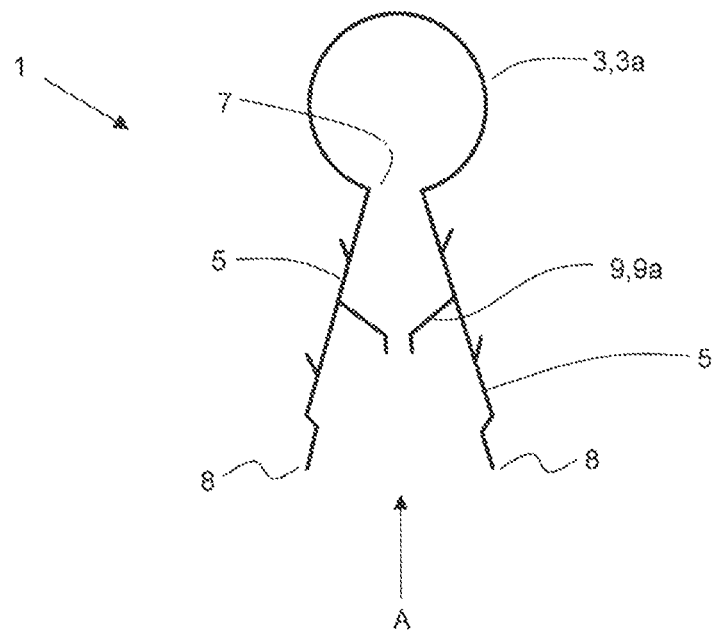
FIG. 1 shows a side view of a fixing.

FIG. 1 shows a side view of a fixing 1 (in the embodiment shown, a cable clip) for securing an article to a surface. The fixing has a coupling arrangement 3 and elongate members, legs 5, extending therefrom.

The coupling arrangement is formed as a loop 3*a* extending between the legs 5. The loop 3*a* is sized to receive one or more cables, conduits, pipes or the like, which may passed between the legs 5 and into the loop 3*a* to be coupled to the fixing 1 (generally in the direction A).

The fixing 1 is shown "at rest", i.e. in the configuration adopted in the absence of any externally applied forces or constraints. The elongate members 5 have proximal ends 7, adjacent to the coupling arrangement 3 and extend to distal ends 8. The elongate members 5 are resiliently biased towards the position shown in FIG. 1, in which they diverge from one another away from their proximal ends 7.

An inner formation 9 extends or branches inwardly of each leg 5. The inner formations 9 are spaced apart from the proximal and distal ends 7, 8.

The inner formations 9, in this case arms 9*a*, are themselves resiliently deformable. Accordingly, when the legs 5 are squeezed together in use (as described in further detail below), the arms 9*a* contact one another and are deflected towards alignment with the legs.

Figure 2:
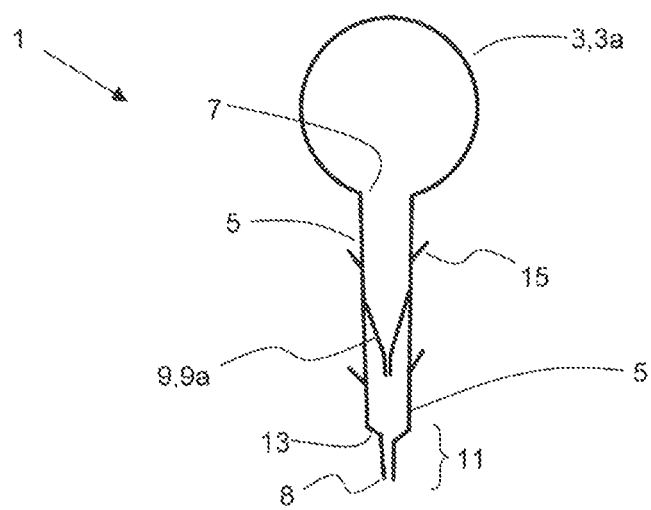
FIG. 2 shows a side view of the fixing of FIG. 1, with elongate members held together.

FIG. 2 shows the configuration of the fixing 1 when the legs 5 are squeezed together in this way. The resilient deformation of the arms 9*a* contributes to the biasing force urging the legs 5 apart. The relatively central position of the arms 9*a* ensures that the outward biasing forces applied by the arms is distributed along the legs 5 both proximally and distally of the arms 9*a*.

In the embodiment shown, the arms 9*a* engage with one another and are resiliently deformed. In other embodiments (not shown) the arms may be staggered, so as to engage with the adjacent leg when the legs are squeezed together.

The distal portions 11 of the legs 5 are inwardly kinked, and transition to the regions proximal thereto via a ramp 13. Thus, when the legs 5 are brought together, the distal fixing is narrowest at it distal ends 7 and the distal regions 11 present an outwardly tapering wedge shape, to assist in insertion into a cavity (as described in further detail below). Additionally, the inner formations, arms 9*a*, are spaced apart from the distal regions along the legs 5, and so do not impede bringing the distal ends together.

The legs 5 are also provided with outwardly extending barbs 15. The barbs 15 are ramped away from the distal ends 7 and so add relatively little resistance to insertion of the legs 5 into a cavity, but act to catch against imperfections in a cavity wall and/or bite into a cavity wall, and resist removal of the fixing 1, as described below. The barbs 15 are positioned both proximally and distally of the arms 9*a*, so that the outward forces applied by the arms in use are effectively transmitted to the barbs.

Figure 3A:
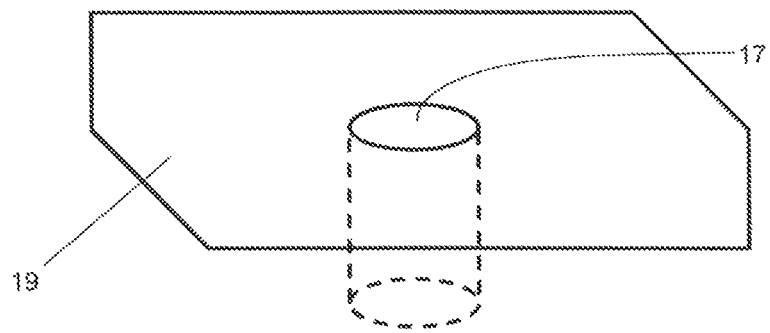
FIGS. 3(*a*)-3(*d*) show the steps of securing an article to a surface.
Figure 3B:
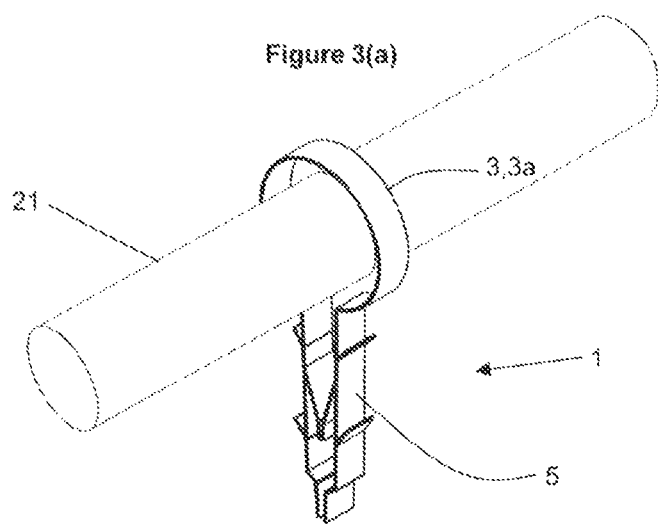

Use of the fixing 1 will now be described with reference to FIGS. 3(*a*)-(*d*). FIG. 3(*a*) shows a hole 17 having been drilled in a surface 19 (e.g. a building wall). FIG. 3(b) shows a perspective view of the fixing 1 with a wire 21 been coupled to the coupling arrangement (loop 3a), by insertion between the elongate members 5 in the direction A as described above with reference to FIG. 1. The fixing 1 is shown with the legs 5 squeezed together (as would typically be done between finger and thumb).

Figure 3C:
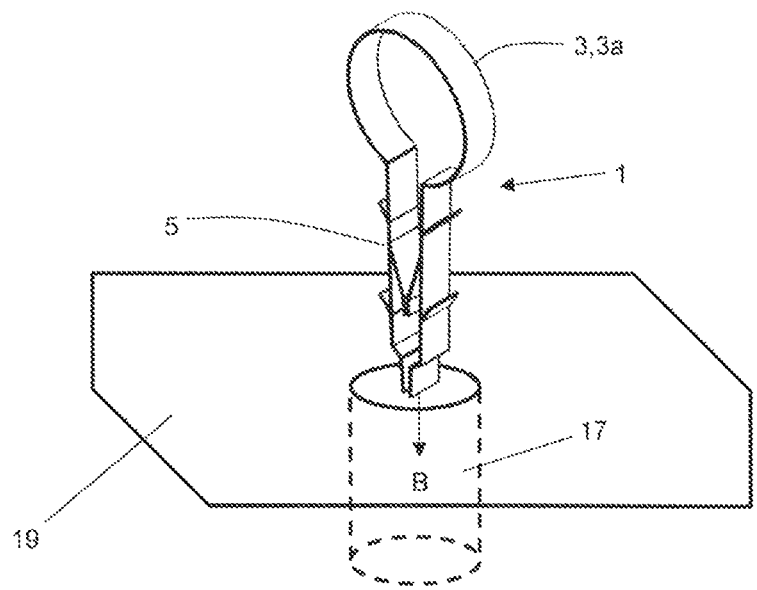
Figure 3D:
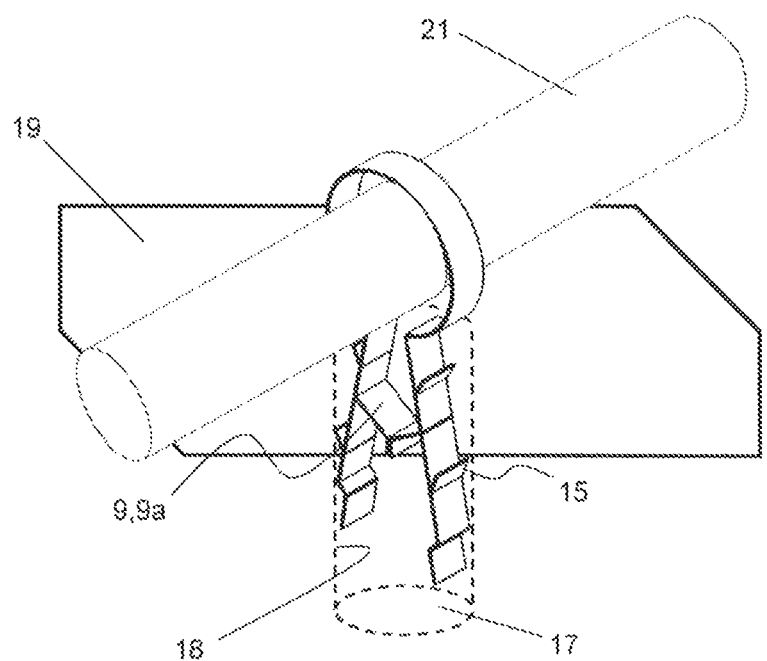

The legs 5 are then inserted into the hole 17 (direction B, FIG. 3(c), in which the wire 21 is omitted for clarity.) As shown in FIG. 3(d), once the pressure holding the legs 5 together has been released, they spring apart and into engagement with the inside walls 18 of the hole 17. During insertion, the lip of the hole 17 and/or the walls 18 may slide against the ramp 13, the smooth transitional surface provided by the ramp thereby facilitating insertion of the fixing into the hole.

There is insufficient space in the hole 17 for either the legs 5, or the resilient inner arms 9a to return to their "at rest" positions as shown in FIG. 1. Accordingly, the arms 9a provide additional outward force of the legs 5 against the walls 18 of the hole 17.

Figure 4:
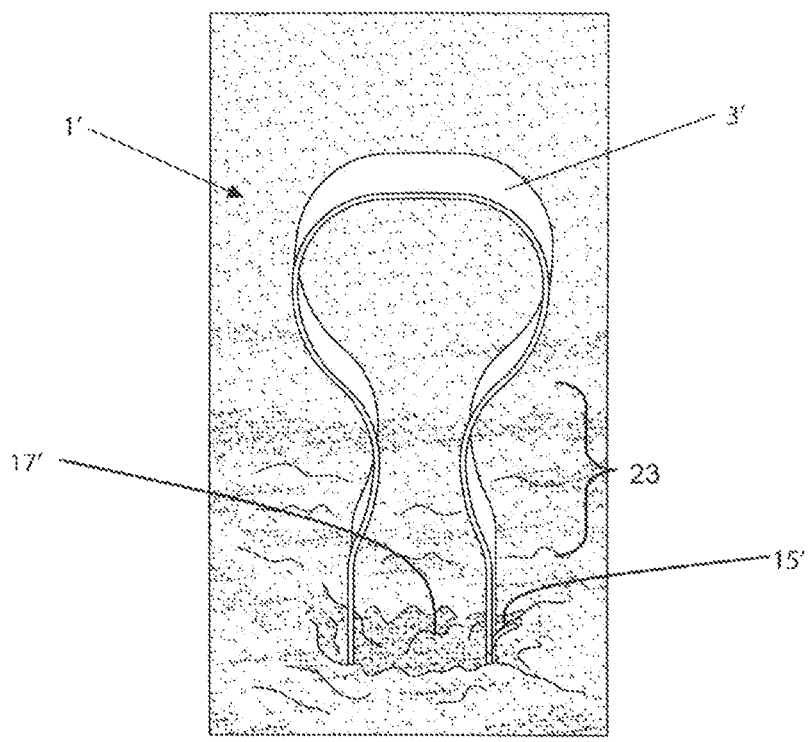
FIG. 4 shows a perspective view of another embodiment of a fixing, positioned in a hole in a concrete surface.

In practice, the inner walls of a drilled hole in typical building material such as concrete, brick, plaster board and the like will be uneven; as depicted in the perspective view of FIG. 4, showing a fixing 1' in a hole drilled in concrete. The rough inner surfaces provide a footing against which barbs 15' can grip.

As also visible in FIG. 4, the legs 5' (or indeed any elongate member) may optionally be curved, in this instance at a proximal region 23 to the coupling arrangement 3', so as to increase the length of the elongate members 5 in contact with the walls of the cavity 17' in which the fixing is placed.

Figure 5:
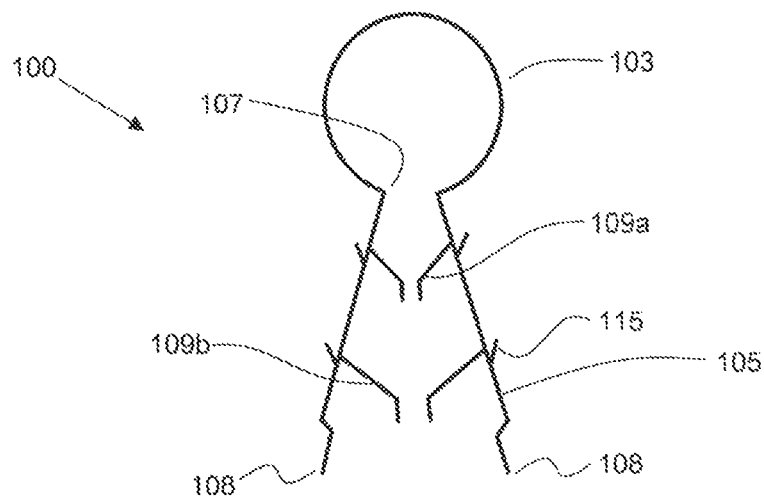
FIG. 5 shows a side view of a further embodiment of a fixing.

An alternative embodiment of a fixing 100 is shown in FIG. 5. Features of fixing 100 in common with fixing 1 are provided with like reference numerals, incremented by 100. The legs 105 of fixing 100 each have two inner formations, arms 109a and 109b. The inner formations are spaced apart from the proximal and distal ends 107, 108 of the legs 105.

In the embodiment shown, the fixing 100 has barbs adjacent to each of the arms 109a, 109b, such that that the outward biasing forces applied by the arms are transmitted to the corresponding adjacent barbs.

Figure 6:
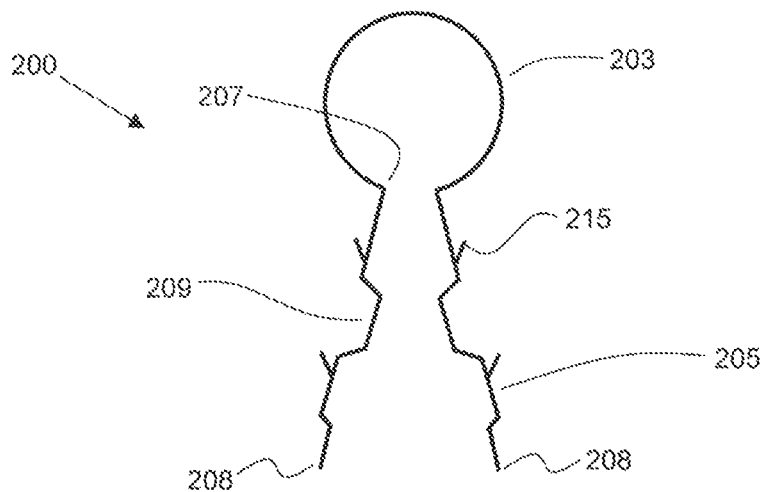
FIG. 6 shows a side view of a still further embodiment of a fixing.

Another embodiment of a fixing 200 is shown in FIG. 6. Features of fixing 200 in common with fixing 1 are provided with like reference numerals, incremented by 200. The legs 205 of the fixing 201 have an inner formation in the form of an inwardly kinked portion 209. By virtue of the resilience of the legs 205 (and thus the inner formations, the kinked portions 209), when the legs are brought together, the inner formations may be resiliently deformed and thus act to urge the legs apart, in the manner described above.

Optionally, the barbs may be formed by cuts in the material of the legs, bent away from the outer face as shown. Thus, the entire clip may be formed from a single strip of a resilient material, such as spring steel.

Figure 7:
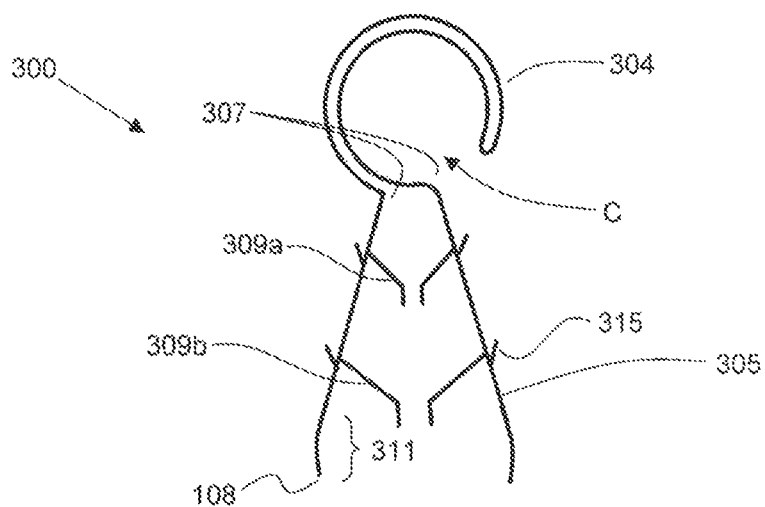
FIG. 7 shows a side view of yet another embodiment of a fixing.

A still further embodiment of a fixing 300 is shown in FIG. 7. Features in common with the fixing 100 are provided with like numerals, incremented by 200. The fixing 300 is provided with a coupling arrangement in the form of a hook 304. An article such as cable, pipework or a frame can be coupled to the fixing by insertion generally in the direction C. The hook is formed from the same strip of resilient steel as the legs 305, and can be bent open so as to admit or remove the article. This arrangement enables an article to be inserted and removed from the coupling arrangement independently of securing the fixing arrangement to a surface.

The distal portions of the legs 305 of the fixing 300 are inwardly curved towards their distal ends 307. When the legs are brought together, the distal portions together form a generally wedged shape, to assist in inserting the fixing into a cavity.

Figure 8:
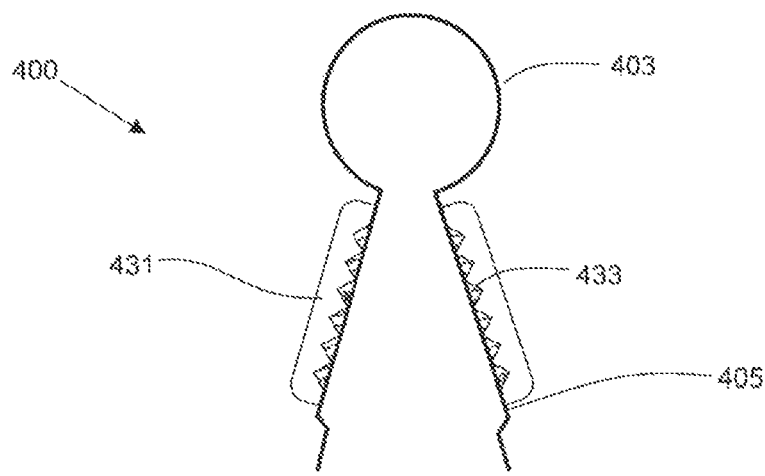
FIG. 8 shows a side view of another embodiment of a fixing.

Yet another embodiment of a fixing 400 is shown in FIG. 8. Features of the fixing 400 in common with the fixing 1 are provided with like reference numerals, incremented by 400. The elongate members, legs 405, are provided with outer conformable regions 431, glued to the outer surfaces of the legs. The outer conformable regions are in the form of elastomeric blocks. In other embodiments, alternative plastics materials may be used. For example, conformable regions formed from PTFE or any other suitable plastics material may be capable of plastically deforming in use, so as to conform to the inner surface of a hole.

The legs also have ribbed outer surfaces 433, so as to increase the surface area of contact to the outer conformable regions. The ribs run perpendicular to the legs (i.e. into and out of the page, from the side view of FIG. 8), and so help to resist slippage between the elastomeric blocks 431 and the legs 405 when forces are applied along the legs, in use.

In use of the fixing 400, when the legs 405 are resiliently biased apart towards the walls of a hold or other cavity, the elastomeric blocks conform to the inner surface of the cavity and so contribute to the pull resistance of the fixing.

In alternative embodiments (not shown) the fixing may be provided both with resiliently conformable inner formations and deformable outer regions.

The invention claimed is:

1. A fixing for securing an article to a surface, comprising:
a coupling arrangement; and
a first elongate member and a second elongate member each extending from the coupling arrangement; wherein each of the first elongate member and the second elongate member comprise an inwardly curved or kinked distal portion;
the elongate members being resiliently biased towards a position in which they are spaced apart from one another along at least a part of their length;
wherein each of said first elongate member and said second elongate member comprises an inner formation spaced apart from a proximal end and a distal end;
wherein each said inner formation is resiliently deformable, the inner formation of the first elongate member being adjacent to the inner formation of the second elongate member; and
wherein when in an at rest state the inner formation of the first elongate member is separate from and extending towards the inner formation of the second elongate member, the inner formation of the first elongate member and the inner formation of the second elongate member being positioned to engage therewith one another and resiliently deform when the elongate members are brought together in use in an engaged state; and
wherein when in said engaged state the inner formation of the first elongate member and the inner formation of the second elongate member apply an outward force to each of the first elongate member and the second elongate member.

2. A fixing according to claim 1, wherein the elongate members are biased towards a position in which they diverge from one another away from their proximal ends.

3. A fixing according to claim 1, wherein the inner formations are positioned to engage with one another, when the elongate members are brought together.

4. A fixing according to claim 1, wherein the inner formations extend from an inside of each elongate member.

5. A fixing according to claim 1, wherein each inner formation comprises a resilient member extending from an inside of a said elongate member.

6. A fixing according to claim 1, wherein each inner formation is formed as a kink, bend or corrugation along said elongate member.

7. A fixing according to claim 1, wherein each elongate member comprises two, or more than two, inner formations; and
wherein the inner formations of each elongate member have at least two inner formations of a same type, or have at least two inner formations of a different type.

8. A fixing according to claim 1, wherein each of the elongate members comprise distal portions free of inner formations.

9. A fixing according to claim 1, wherein the elongate members comprise one or more barbs or projections extending outwardly.

10. A fixing according to claim 1, wherein the coupling arrangement comprises a loop or hook.

11. A fixing according to claim 1, wherein the coupling arrangement comprises a loop, extending from the proximal end of a first elongate member to the proximal end of a second elongate member.

12. A fixing according to claim 1, wherein the elongate members and the coupling arrangement are formed from a single strip of material.

13. A fixing according to claim 1, wherein the fixing comprises or is substantially formed from a resilient material.

14. A fixing according to claim 1, wherein each of the elongate members comprise one or more barbs or projections extended outwardly from the elongate member, said one or more barbs or projections formed by a plurality cuts in a material of each elongate member, said material proximate to said plurality of cuts bent away from the elongate member.

15. A method of fixing an article to a surface, comprising;
providing a cavity having an inner surface;
providing a fixing having at least two elongate members comprising a first elongate member and a second elongate member extending from a coupling arrangement; the elongate members being resiliently biased towards a position in which they are spaced apart from one another along at least a part of their length;
providing a first inner formation of a first elongate member separate from and extending towards a second inner formation of a second elongate member when in a rest state;
bringing the elongate members closer together and inserting the elongate members into the cavity;
configuring said first inner formation spaced apart from a proximal end and a distal end of the elongate member from which said first inner formation extends, and configuring said second inner formation spaced apart from a proximal end and a distal end of the elongate member from which said second inner formation extends;
resiliently deforming said first inner formation and said second inner formation generating an outward force to bias the elongate members apart from one another;
applying said outward force to the elongate members by said first inner formation and said second inner formation; and
coupling the article to the inner surface of the cavity.

* * * * *